Sept. 3, 1940.                C. R. DALE                2,213,486
         LEVEL INDICATOR FOR USE IN CEMENTING WELLS
                     Filed June 6, 1938
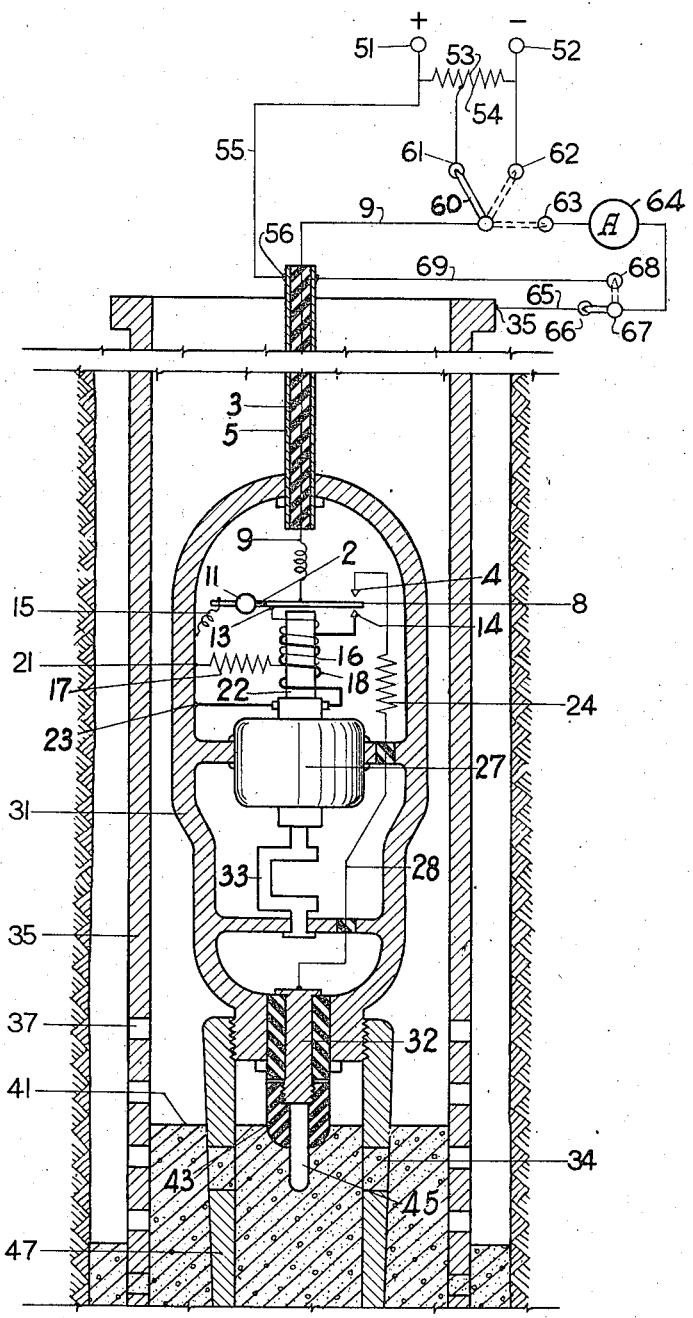
Inventor: Clarence R. Dale
By his Attorney:

Patented Sept. 3, 1940

2,213,486

UNITED STATES PATENT OFFICE 2,213,486

LEVEL INDICATOR FOR USE IN CEMENTING WELLS

Clarence R. Dale, Beverly Hills, Calif., assignor to Dale Service Corporation, a corporation of California Application June 6, 1938, Serial No. 212,112

2 Claims. (Cl. 177—311)

This invention pertains to the art of cementing wells and relates more specifically to an electric device whereby the level of a cementing mixture placed in the well can be accurately determined.

In cementing the casing of an oil well by any of the generally accepted methods, it is often necessary or advantageous to determine the exact level of the cement-drilling mud or cement-well fluid interface within the casing.

Cement level determinations are of especial importance when using a cement vibrator, such, for example, as described in my co-pending application Serial No. 117,914, filed December 28, 1936, or in my Patent No. 2,072,982. In using said vibrator, the following procedure is usually followed: a batch of cementing mixture is placed within the well casing or liner, the vibrator is lowered into the well to such a depth that preferably only the vibrating tube, attached to the lower end of the vibrator, is immersed in the cementing mixture, and the latter is subjected to high-frequency vibrations which drive it out of the casing or liner (for example, around the lower edge of the casing, or through suitable perforations) into the annular space between the casing and the walls of the borehole. When said annular space is filled with the cementing mixture to the same level as within the casing, the vibrator is withdrawn, the next batch of cementing mixture is placed within the casing, and the vibrating operation repeated. This procedure is carried out as many times as necessary to cement the casing throughout the desired vertical distance, whereafter the cement within the casing is drilled out, and the water shut-off test applied in the usual way. In using this process, it is very important to determine with great accuracy the level occupied by each batch, and especially the level of the interface between the uppermost cement batch and the drilling fluid in order that the vibrator may be lowered each time to the proper depth. If, for example, the vibrator is lowered beyond the correct level, and the vibrating tube penetrates a cement layer which had already been vibrated, and had acquired a relatively high consistency due to the vibrating treatment and to a partial setting of the cement, the vibrator may easily become jammed or frozen in the hole, thereby necessitating costly and sometimes fruitless fishing operations.

It is obvious, that the same reasons apply for accurately determining the cement level when carrying out cementing operations by means of a vibrator in an uncased portion of the borehole, for example, in shutting off bottom-hole waters.

It is therefore an object of this invention to provide an electric device comprising a probing electrode whereby the interface between the cementing mixture and the drilling fluid in the well can be accurately determined either in the cased or the uncased portion of the borehole.

It is another object of this invention to provide a suitable electric circuit for the electrode of the type described whereby an electric current may be passed through said electrode to remove from its surface undesirable polarization products tending to decrease its efficiency.

It is a further object of this invention to provide a cement vibrator equipped with an electrode of the type described and with automatic switching means, whereby the same electric circuit may be used to carry the current for the motor of the vibrator and the probing electrode.

These and other objects of the invention will be understood from the following description, taken with reference to the attached drawing, which shows diagrammatically a cross-section view of a preferred embodiment of the probing electrode mounted on a cement vibrator. It must, however, be noted that the present invention is not confined to the use of the present electrode in combination with a cement vibrator, and that the probing electrode may be used when cementing wells by any other method in order to determine with accuracy the level of the cement mixture in the borehole.

Referring to the drawing, a casing or liner 35, which may be provided with perforations 37, is shown in a borehole filled with a cementing mixture up to a level 41, and with drilling fluid above said level. A cable, comprising an electric conductor 9, an insulating envelope 3, and a steel or metal sheath 5, is used to lower into the borehole the vibrator casing or housing 31, carrying attached to its lower end an open-ended metallic vibrating tube 47.

The housing 31 contains an electric motor 27, usually of the D. C. type, and an eccentric rotatable element 33, actuated thereby.

The lower end of the housing 31 is closed by means of a fluid-tight dielectric gland 43, which may be made of a material such as Bakelite, hard rubber, etc. An electrode 45 is held by the gland 43 in such a manner as to project to a relatively small distance below the lower end of the gland. When cementing a casing or liner made, as is customary, of a ferrous material, the electrode 45 is made of a metal which is either below iron in the electromotive series of metals, for example, lead, copper, silver, etc., or above it, for example, zinc, aluminum, etc. When cementing a liner made of aluminum, the electrode 45 may be made of iron. When cementing a liner made of a non-metallic material, such as Bakelite, or when cementing in an uncased portion of the hole, the electrode 45 may be made of a material such as carbon, as will be explained further. Perforations 34 are provided in the vibrating tube 47 at approximately the level of the projecting portion of the electrode 45.

A metallic contact piece 32 passes axially through the gland 43 and is in electrical contact with the electrode 45. The contact piece 32 is electrically connected to a conductor 28, into which a resistance 24 may be inserted, and therethrough to a contact point 4, which forms part of a relay mechanism mounted within the housing 31 in any desired manner and comprising the following elements: (1) an electro-magnet 22, carrying a low-resistance winding 18, connected on one side to a contact point 14, and on the other side to the electric motor 27 (for example, to one of the brushes, the other brush being grounded), and also a high-resistance winding 16, connected on one side to a contact bar 8, and grounded on the other side to the housing 31, through a resistance 17; (2) a contact bar 8 rotatably mounted on a pivot 11, one of the arms of said bar being actuated by a spring 15, and the other arm being adapted to engage either contact point 4 or contact point 14. Said last arm of bar 8 is electrically insulated from the housing 31 as shown at 2, and is electrically connected, for example, by welding, brazing, etc., to the conductor 9 passing through the cable supporting the housing 31, and to the high-resistance winding 16 on the magnet 22.

The apparatus at the surface of the ground may comprise a source of E. M. F., for example, a 350–400 volt rectifier set (not shown), connected between terminals 51 and 52; a high resistance, such, for example, as a 10,000 ohms resistor 53, also connected between said terminals, one of the ends of said resistor being grounded in any desired manner, but preferably to the cable sheath as shown at 56, and the other end connected to a terminal 62. The resistor 53 is tapped at 54 and connected to the terminal 61, in such a manner as to give a potential of about 50 volts between point 56 and terminal 61. An indicating device, such as a microammeter 64, is connected on one side to the terminal 63, and is grounded on the other side in any desired manner, for example, to the casing 35 or to the cable sheath 5, through a switch 66—67—68. A switch 60, adapted to contact any of the terminals 61, 62 or 63 is connected to the conductor 9 passing through the cable.

The present device is operated as follows:

A desired batch of cementing mixture is placed in the borehole, filling the casing 35 to a level 41, the portion of the well above the level 41 being filled with drilling fluid. In order to determine the exact level of the cement-drilling fluid interface 41, the housing 31 is lowered into the borehole, the switch 60 being set to contact terminal 63. Since the action of the spring 15 tends to keep the contact bar 8 in engagement with the contact point 4, the following circuit is established: meter 64-switch 60—63, conductor 9-contact bar 8-contact point 4-conductor 28-contact piece 32-electrode 45-drilling fluid-casing 35-conductor 65, switch 66—67, and back to meter 64. The casing 35 being made of a ferrous metal, such as steel, and the electrode 45 of a metal which is either above or below iron in said series, such as zinc or lead, the drilling fluid in the borehole serves as an electrolyte and causes a current to flow in said circuit between the cathode 45 and the anode 35, said current being registered by the meter 64. While the electrode 45 is being lowered through the drilling fluid, the reading of the meter 64 remains substantially constant, being subject only to small deflections due to local variations in the composition of the drilling fluid. When, however, the electrode 45 reaches the level 41 and becomes immersed in the cementing mixture, which has entirely different electrolytic properties than the drilling fluid, or well fluid, a sharp change in the reading of the meter 64 indicates the exact location of the level 41 with a precision to a few inches.

If then, it is desired to vibrate the cementing mixture, the switch 60 is thrown into contact with terminal 62, whereby the circuit of the meter 64 is opened, and the voltage between terminals 51 and 52 is impressed on the high-resistance winding 16 by means of the circuit comprising the switch 60—62, conductor 9, contact bar 8, high-resistance winding 16, resistance 17, housing 31, cable sheath 5 and conductor 55. The voltage impressed on the high-resistance winding 16 forces through the latter a current of sufficient intensity to cause the magnet 22 to overcome the effect of the spring 15 on the pivoted contact bar 8 which is pulled out of engagement with contact point 4 and engages the contact point 14, whereupon an operating current is supplied to the vibrator motor by means of a circuit comprising conductor 9, contact bar 8, low-resistance winding 18, motor 27, ground 23, housing 31, sheath 5 and conductor 55. The low-resistance winding 18 is arranged in such manner that its energizing effect on magnet 22 is additive to that of the high-resistance winding 16, since otherwise the current supplied to the motor 27 would reduce the current through the high-resistance winding 16 to a value below that necessary for overcoming the tension of the spring 15, and the contact bar 8 would be again pulled out of engagement with the contact 14 by the spring 15.

After vibrating the cementing mixture for a desired length of time, the switch 60 is again thrown into position 63, to determine, from the lowering of the level 41 within the casing, the amount of cement forced out of said casing. When several such readings indicate that the cement level within the casing remains stationary, and that therefore the cement within and outside the casing is at the same level, the next batch of cementing mixture may be lowered into the casing, and the operations carried out as before.

Since a polarization effect occurs at the surface of the electrode 45 and greatly reduces, after a certain time, the value of the E. M. F. electrolytically generated within the well, means are provided according to the present invention to neutralize said effect and to remove, when desired, the polarization products from the surface of the electrode 45. For this purpose, the switch 60 is thrown into contact with terminal 61. The potential impressed on the high-resistance winding 16 is in this case insufficient to cause the magnet 22 to overcome the action of the spring 15, the contact bar 8 remaining in engagement with contact 4. An electric current flows therefore through the electrolyte between the electrode 45 and the steel vibrating tube 47 in a direction opposite to that generated by electrolytic action when no outside potential is applied to the circuit. This current decomposes the polarization compounds formed on the surface of the electrode 45, and brings its efficiency back to the original value.

It may be noted that instead of generating the detector E. M. F. by the action of the electrolyte between the electrode 45 and the casing 35, this E. M. F. may be generated between the electrode 45 and the steel body of the housing 31 or vibrating tube 47, which is of especial importance when cementing is carried out in an uncased portion of the borehole.

In such cases, the vibrating tube may be totally or partially lined or plated with any desired metal, for example a metal relatively high in the electromotive series, such as zinc, while the probing electrode may also be made either of any suitable metal or of an element such as carbon, the E. M. F. generated thereby having a sufficiently high value for the purposes of this invention.

For this purpose, after throwing the switch 60 to position 63, the switch 67 is thrown from position 66 to position 68, the meter circuit comprising in this case the meter 64, switch 60—63, conductor 9, bar 8, contact 4, conductor 28, electrode 45, vibrator tube 47, housing 31, sheath 5, conductor 69, switch 67—68, and back to meter 64. Since in this case the high-resistance winding 16 is in parallel with the meter circuit, a high-resistance 17, such as 5000 ohms is usually inserted in series therewith to prevent it from drawing any appreciable current and disturbing the readings of the meter.

The resistance 24, which may have a value such as 100 ohms, is placed in series with the electrode 45 to insure the proper operation of the automatic relay switch, since the low resistance of the fluid between electrode 45 and vibrating tube 47 may cause an excessive current to flow to the electrode 45 at the moment when switch 60 is thrown to position 62, thereby preventing the high-resistance winding 16 from being sufficiently energized to pull the contact bar 8 from contact 4 to contact 14.

The motor 27 may have any desired rating, such, for example, as ¼ H. P., operating on about 85 volts and 2.5 amperes. Since the vibrator is usually run on a 10,000 foot cable, a voltage of 350–400 volts is required on the surface to supply the necessary power to the vibrator.

I claim as my invention:

1. In a system comprising a housing adapted to be lowered into a borehole on a conductor cable, said housing enclosing an electric motor and carrying an electric element capable of transmitting to the surface indications of conditions suitable for the operation of the motor, the combination comprising a switch within the housing normally closing a circuit comprising the conductor cable and the electric indicating element, an electric relay having additive polarity windings of high resistance connected to the conductor cable and of low resistance connected to the motor, said high resistance winding becoming energized when a potential is applied to the cable at the surface, said switch being actuated by the energization of the high resistance winding to open the circuit comprising the cable and the indicating element and to close a circuit comprising the cable and the low-resistance winding, the current flowing thereupon through said winding serving to drive the motor and to energize said low-resistance winding to maintain the switch in the position closing the motor circuit.

2. In a system for determining the level for cementing the casing of a well and for cementing said casing by the vibratory method, said system comprising a housing adapted to be lowered into the well on a conductor cable, said housing enclosing an electric motor and carrying an electric level-indicating element, the combination of a switch within the housing normally connecting said level-indicating element to the cable, a relay having additive polarity windings of high resistance connected to the cable and of low resistance connected to the motor, said high resistance winding becoming energized when a potential is applied to the cable at the surface, said switch being actuated by the energization of the high resistance winding to disconnect the cable from the level-indicating element and to connect the cable to the low-resistance winding, the current flowing thereupon through said low-resistance winding serving to drive the motor and to energize said low-resistance winding to maintain the switch in a position connecting the cable to the motor.

CLARENCE R. DALE.